United States Patent [19]

Baird

[11] Patent Number: 5,762,147
[45] Date of Patent: Jun. 9, 1998

[54] TRACTOR FRONT MOUNT FOR IMPLEMENT ATTACHMENT AND USE

[76] Inventor: James E. Baird, 125 Hiett Ln., Longview, Tex. 75605

[21] Appl. No.: 781,442

[22] Filed: Jan. 10, 1997

[51] Int. Cl.$^6$ .............................. F02F 3/76; A01B 63/102
[52] U.S. Cl. .............. 172/831; 172/611; 172/668; 172/680; 172/744; 37/266
[58] Field of Search .................. 172/611, 668, 172/451, 811, 817, 828, 830, 831, 445.1, 439, 677, 679, 680, 744, 776, 781, 272; 37/232, 266, 268, 269, 270, 272

[56] References Cited

U.S. PATENT DOCUMENTS

| | | | |
|---|---|---|---|
| 1,788,879 | 1/1931 | Lile et al. | 37/270 |
| 2,117,561 | 5/1938 | McMaster | 37/232 |
| 2,622,500 | 12/1952 | Hugger | 172/611 X |
| 2,862,315 | 12/1958 | Blanchet | 172/828 X |
| 3,220,582 | 11/1965 | Pilch | 172/611 X |
| 3,480,294 | 11/1969 | Lichti | 172/611 |
| 3,851,712 | 12/1974 | Purcell | 172/611 X |
| 4,148,365 | 4/1979 | Anderson | 172/781 |
| 4,322,094 | 3/1982 | Bobard | 172/611 X |
| 4,489,791 | 12/1984 | Schneider | 172/776 |
| 4,502,709 | 3/1985 | Schaeff | 172/611 X |
| 4,737,067 | 4/1988 | Samejima et al. | |
| 4,919,212 | 4/1990 | McClure | 172/817 X |
| 5,154,241 | 10/1992 | Comer et al. | 172/811 X |

FOREIGN PATENT DOCUMENTS

| | | | |
|---|---|---|---|
| 767282 | 4/1952 | Germany | 172/811 |
| 922158 | 1/1955 | Germany | 172/811 |

Primary Examiner—Terry Lee Melius
Assistant Examiner—Christopher J. Novosad

[57] ABSTRACT

This invention is a simple, safe, and inexpensive beam structure for tractor forward mounting of a blade (24). A pivot plate (11) is mounted at the tractor lower mid-section. Parallel beams (12) are positioned through the pivot plate (11) and extend beyond the tractor front and rear. The aft ends of beams (12) are attached to the tractor 2 or 3 point rear hydraulic lift arms (26). The forward ends of the beams (12) are the blade primary attachment points. A counterweight (13) attached rearward will raise the blade (24) when the tractor 2 or 3 point rear hydraulic lift arms (26) are lowered. The blade (24) is lowered by raising the 2 and 3 point rear hydraulic lift arms (26), thereby, giving effective vertical control of the front mounted blade.

3 Claims, 3 Drawing Sheets

5,762,147

TRACTOR FRONT MOUNT FOR IMPLEMENT ATTACHMENT AND USE

BACKGROUND-FIELD OF INVENTION

This invention relates to an improved and inexpensive means of front blade attachment to prime movers such as farm and construction tractors.

BACKGROUND-DESCRIPTION OF PRIOR ART

Heretofore the blade attachment to the tractors was by a hydraulically activated lift arm. Tractor rear mounted implements were lifted by a 2 or 3 point rear hydraulic lift arms system. Tractor forward and front mounted implements were lifted by costly additional hydraulic systems usually mounted near the implement. Another front mounted system found in the patent files (U.S. Pat. No. 4,489,791 to Schneider 1984) consisted of a wrap-around tool bar structure outside of the tractor tires and connected to the 2 or 3 point rear hydraulic lift arms system. U.S. Pat. No. 4,489,791 also required the tool bar structure to be pivoted on bearings mounted on the tractor rear axle. This mounting system is costly, complicated, and causes interference with surroundings when used for construction, grading, snow removal, and land clearing.

Objects and Advantages

Accordingly, the purpose of my invention is to provide an inexpensive, simple, and safe operating means of frontal mounting of a blade on farm and construction tractors.

With this thought in mind, this invention contemplates a beam structure system where steel beams are placed through a steel pivot plate that is mounted to the lower mid-section of the tractor. The pivot plate allows the beams to pivot and slide relative to the pivot plate. The pivot plate vertical and horizontal location is selected to give maximum movement and non-interference of each steel beam relative to the tractor. The steel beams are each directly attached to the 2 or 3 point rear hydraulic lift arms by pins or bolts that allow rotational movement. A rear counterweight required for lifting the steel beam forward section is located between the 2 or 3 point connection points. This counterweight location also adds rigidity to the invention, but other locations and means for lifting would be acceptable. A front mounted blade can now be raised or lowered by the 2 or 3 point hydraulic lift arms system.

The object of this invention is to provide a steel beam structure system permitting the attachment of a blade to the system front. The rear counterweight, mid-tractor pivot plate, and rear hydraulic lift arms system 2 or 3 point connections allow blade lift and lowering control.

Another object of this invention is to use the tractor's basic 2 or 3 point rear hydraulic lift arm system and not require the common addition of hydraulic units and associated structure for a front mounted blade.

Other objects of this invention are to provide an inexpensive, easily mounted and dismounted, and safe operating front blade mounting system. The safe operation results from the steel beams basically imparting horizontal force to the tractor at the 2 or 3 point rear hydraulic lift arms with only a minimum of vertical force. Common tractor front attachments often impart significant vertical force to the tractor at a more forward position and can result in the tractor front wheels being lifted off of the ground in an unsafe manner.

Another object of this invention is the location of the steel beams within the transverse span of the tractor wheels. The location reduces surroundings interference when compared to a structure that is located outside of the wheels.

Another object of this invention is to provide resistance to the frontal blade upward forces by using the basic 2 or 3 point rear hydraulic lift arms system. The lift arms system maintains frontal blade depth while the common rear mounts only have the blade weight to maintain blade operating depth.

Another object of this invention is to connect the force from the blade engagement directly to the basic 2 or 3 point rear hydraulic lift arms which are designed for this action.

Another object of this invention is to provide a tractor frontal system that can be easily installed and removed on different tractors with little or no modification to either the tractor or the front mount system.

Another object of this invention is to provide front blade resistance to vertical axis twist when the blade is loaded at either end. The common rear 2 or 3 point blade mounting is susceptible to damage when end loaded.

Another object of this invention is to allow front blade positioning about the tractor longitudinal axis by the mechanical adjustment of the 2 or 3 point rear hydraulic arm that is adjustable.

Another object of this invention is to allow front blade positioning about the vertical axis of the tractor. The adjustment is accomplished by connecting the desired 2 or 3 point rear hydraulic lift arm to a steel beam location slightly forward or rear of normal. This effectively shortens or lengthens one steel beam relative to the other beam.

Another object of this invention is to allow the front blade to be tilted forward or rearward by using an adjustable turnbuckle to replace the blade braces.

Other objects and advantages will become apparent from a consideration of the ensuing description and drawings.

DRAWING FIGURES

Figure 1:
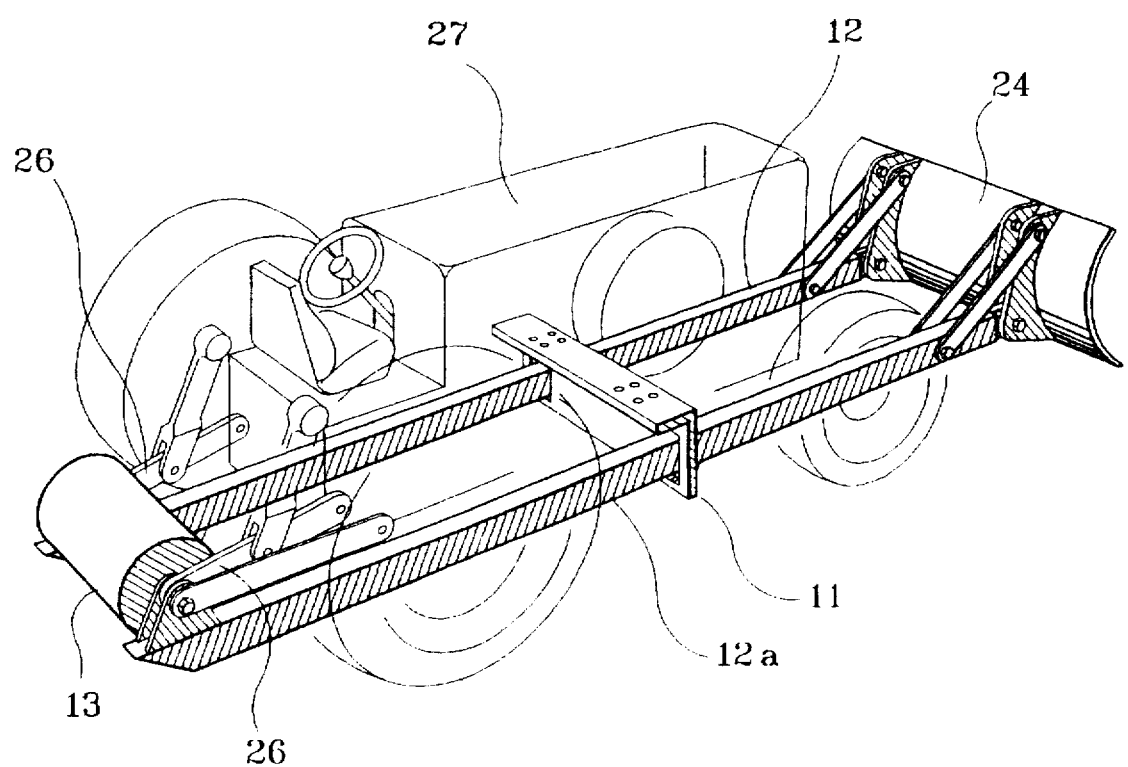
FIG. 1 shows the tractor front mount system on a standard tractor. A dirt blade is attached.

Reference Numerals In Drawings 11 pivot plate
12 beam
13 counterweight
14 bolts-aft
15 bolts-blade mounting
16 nuts-blade mounting
17 bolts-blade brace
18 braces-front blade
19 nuts-blade brace
20 clips-blade to brace
21 clips-blade to beam
22 tab-beam front end
23 clips-beam aft
24 blade
25 holes-pivot plate
26 tractor rear hydraulic lift arm 27 tractor 28 brace bar

Figure 2:
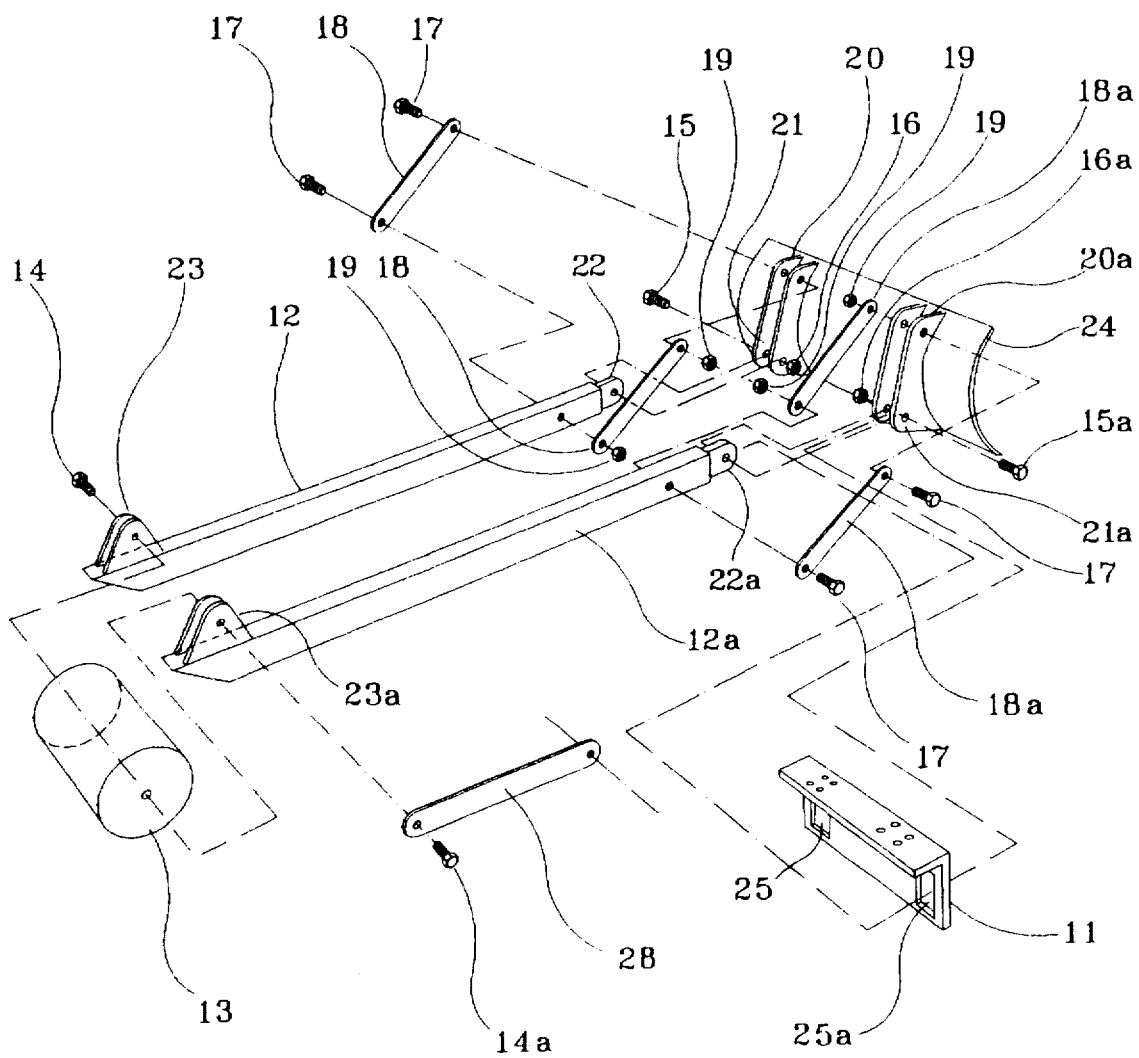
FIG. 2 shows an "exploded" view of the tractor front mount system where a dirt blade attachment is included.
Figure 3:
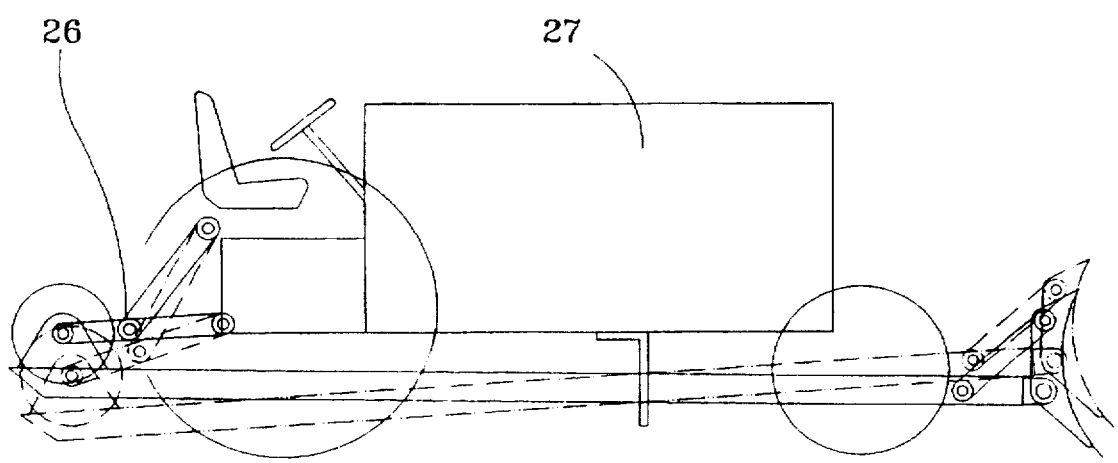
FIG. 3 shows a side view of the tractor front mount system where the system and attached blade are shown in a "down" and "up" positions.

Description-FIGS. 1 to 3

Referring now to the drawings, and more particularly FIG. 2 thereof of the invention indicated in its entirety, including beam members 12 and 12a, is a typical front attachment of blade 24, the pivot plate 11, and counterweight 13. Both steel beam members 12 and 12a are typically made from 2 inch by 4 inch mild steel tubing of approximately 3/16 inch wall thickness. The members 12 and 12a have tabs 22 and 22a welded onto the front and clips 23 and 23a welded onto the rear. The rear clips 23 and 23a are raised slightly to allow the beams 12 and 12a to be parallel to the rear hydraulic lift arms 26. This alignment prevents the rear hydraulic lift arms 26 from being pushed upward when force is applied by the forward blade 24.

The tractor 27 rear hydraulic lift arms 26 are attached to the steel beam members 12 and 12a at the clips 23 and 23a by fitting between the clips 23 and 23a "ears". Bolts 14 and 14a are then inserted through clips 23 and 23a outer ears, through the rear hydraulic lift arm 26 annulus, and through the clips 23 and 23a inner ears.

The counterweight 13 must weigh approximately 30% more than the opposing weight on the front side of the pivot plate 11. By making the counterweight 13 horizontal dimensions equal to the desired distance between the clips 23 and 23a, the counterweight 13 provides a second function of increasing system rigidity. The counterweight 13 can be rigidly attached to the clips 23 and 23a by bolts 14 and 14a.

The steel pivot plate 11 is made from 5/16 inch thick mild plate and has guide holes 25 and 25a that are the profile of the beams 12 and 12a. The holes 25 and 25a are slightly larger than the beams 12 and 12a to allow pivoting and sliding movement of beams 12 and 12a. The pivot plate 11 horizontal part has holes for bolting onto the tractor lower mid-section which usually has threaded receptacles near the mid-point of the tractor "belly".

The beam 12 and 12a front tabs 22 and 22a should not extend beyond the cross-sectional dimension of the beams 12 and 12a. This dimension restriction allows the beams 12 and 12a to be easily removed and installed on the tractor by sliding through the pivot plate 11 openings 25 and 25a.

FIG. 2 shows blade 24 as the attachment for this invention. The blade 24 is attached by mating clips 21 and 21a to tabs 22 and 22a on the front end of steel beams 12 and 12a. Loose fitting bolts 15 and 15a and nuts 16 and 16a provide mechanical connection. The top edge of blade 24 has clips 20 and 20a to provide anchor points for bracing bars 18 and 18a. The bracing bars 18 and 18a are connected to the blade 24 at clips 20 and 20a and the steel beams 12 and 12a with bolts 17 and 17a and nuts 19 and 19a. This design provides blade 24 with stability about an axis transverse to tractor 27. The bracing bars 18 and 18a can be shortened or lengthened to provide the desired blade face angle to the ground.

When the rear hydraulic lift arms 26 are activated by the tractor 27, the connection to steel beams 12 and 12a will provide means to raise or lower the front mounted blade as desired.

Additional rigidity can be achieved with this invention by using a common brace bar 28 afforded for 2 and 3 point implement rear attachments. The brace bar 28 is anchored to the tractor 27 rear drive axle housing near the rear wheels with the other end of the brace bar attached to the bolts 14 and 14a.

The counterweight 13 can easily be made from large steel pipe filled with sand and capped at each end with steel plate. A nut welded to said steel end plates will receive the bolts 14 and 14a for mounting to the clips 23 and 23a.

Operation-FIGS. 1, 2, and 3

This invention is easily attached to the tractor in the described embodiment by bolting pivot plate 11 to the tractor lower mid-section "belly" mount holes that are commonly available on farm and construction tractors. The steel beams 12 and 12a are passed forwardly through the pivot plate 11 holes 25 and 25a. The rear hydraulic lift arm 26 ends are placed between the clips 23 and 23a ears and the bolts 14 and 14a are connected through the clips 23 and 23a outer ear, rear hydraulic lift arm 26 annulus, clips 23 and 23a inner ears, and threaded into a nut welded on each end of the counterweight 13. A brace bar 28 may be placed from the bolt 14 or 14a to the tractor rear axle housing. The blade attachment to the beams 12 and 12a front is by bolting directly to the tabs 22 and 22a for items such as a dirt blade 24. The front blade 24 bracing is accomplished by bolting braces 18 and 18a to the blade and to the holes provided in beams 12 and 12a.

Summary, Ramifications, And Scope

With the invention attached, the tractor can be driven over soil or other foundation and perform the normal function of the blade with much improved visibility and, thereby, improved control of the blade. The tractor traction is improved by the invention's added weight which is located low and is near balanced front to rear and side-to-side of the tractor. Safety is improved over the conventionally mounted front blade because the long beams 12 and 12a impart thrust to the rear of the tractor while the conventional front mount usually imparts the thrust at a more forward position. This conventional system can result in the tractor front wheels being lifted off the surface and causing a serious accident.

Thus, the reader will see that the tractor front mount system of this invention provides an economical, ease of attachment and removal, and safe device that can be used on tractors with common 2 or 3 point rear hydraulic lift arms systems that date back to the mid-1930's.

While the above description contains many specificities, these should not be construed as limitations on the scope of the invention, but rather as an exemplification of one embodiment thereof. Many other variations are possible. For example, the pivot plate can be mounted on the side or bottom of the tractor, and can be located forward or rearward and raised or lowered, along with various beam spacing to meet the blade weight and elevation needs. The pivot plate 11 openings 25 and 25a may be open on the side or bottom to facilitate beam 12 and 12a mounting to the tractor. Additionally, the beam 12 and 12a may be round, square, or common structural steel with the pivot plate 11 changed accordingly. Beam 12 and 12a and pivot plate 11 also can be of material other than steel as long as structural strength and rigidity are sufficient. The counterweight 13 can be of any acceptable construction and shape and connected any place rearward of the pivot plate 11. While a counterweight is described in this invention, any force system method and location of applying counter force to the weight forward of the pivot plate 11 would suffice. This includes using springs, dual acting 2 or 3 point hydraulic system, and added hydraulic systems. Accordingly, the scope of the invention should be determined not by the embodiments illustrated, but by the appended claims and their legal equivalents.

It is thought that persons skilled in the art to which the invention is related will be able to obtain a clear understanding of the invention after considering the description in connection with the drawings. Therefore, a more lengthily description is regarded as unnecessary.

Changes in shape, size, and arrangements of details and parts such as come within the purview of the invention claimed may be resorted to in actual practice, if desired.

I claim:

1. In combination with a tractor, including a tractor body equipped with rear hydraulic lift arms and a lower mid-section, beam structure system for forward mounting of a blade comprising:

a. a pivot plate attached to the lower mid-section of said tractor wherein said pivot plate contains two openings;

b. two beams fitted through said pivot plate openings that are longitudinally aligned with said tractor;

c. said beams being attached to said rear hydraulic lift arms;

d. said blade being mounted to said beams forward of said pivot plate; and e. a force system means for providing downward force rearwardly on said beams that will provide lift to said blade.

2. The beam structure system of claim 1 wherein said blade is raised and lowered by lowering and raising said rear hydraulic lift arms.

3. The beam structure system of claim 1 wherein means for depth control of said blade is provided by said rear hydraulic lift arms which control the position of said beams.

* * * * *